C. F. STOCK & D. M. MORRIS
Ball-Trap.

No. 217,424.  Patented July 8, 1879.

Witnesses:
Luther Thurlow
Lyndhurst Thurlow

Inventor:
David M. Morris
by E. Thurlow, atty in fact.
Charles F. Stock
by E. Thurlow, atty in fact.

UNITED STATES PATENT OFFICE.

CHARLES F. STOCK, OF PEORIA, AND DAVID M. MORRIS, OF QUINCY, ILL.

IMPROVEMENT IN BALL-TRAPS.

Specification forming part of Letters Patent No. 217,424, dated July 8, 1879; application filed May 19, 1879.

*To all whom it may concern:*

Be it known that we, CHARLES F. STOCK, of the city of Peoria, State of Illinois, and DAVID M. MORRIS, of Quincy, in the State of Illinois, have invented an Improvement in Ball-Traps for Practicing Shooting on the Wing; and do hereby declare that the following is a full, clear, and exact description thereof, reference being had to the annexed drawings, making a part of this specification, in which like letters of reference refer to like parts, and in which—

Figure 1:
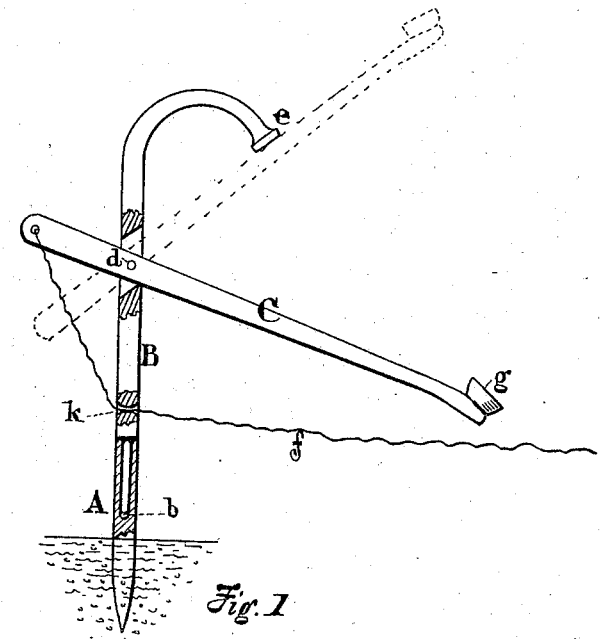
Figure 2:
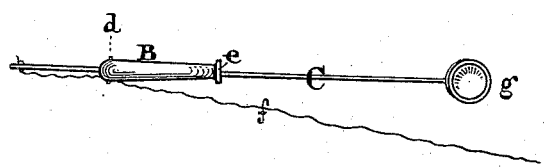

Figure 1 represents an elevation; Fig. 2, a plan view.

This invention consists, first, in abolishing the spring or spring-arm or similar motor for throwing the balls (used to shoot at) and substituting a cord, leather thong, or wire, to be pulled by the operator, (or trap-puller,) whereby different velocities of projecting the ball are obtained; second, in employing a lever for throwing the balls, which is pivoted at a point between the power and the weight, and operated by means of a cord or wire, &c., in place of a trigger and spring; third, in making the trap in such a mode as to revolve on a vertical axis, so as to be capable of projecting balls to any point of the compass; fourth, in making the trap portable and capable of being instantaneously set and fixed firmly, and abolishing the ordinary cumbrous frame of such traps and the troublesome plan of pinning the same to the ground.

We construct the throwing part of the trap of an arm or lever, pivoted on one side of its middle portion, so as to vibrate vertically on a support which can be revolved vertically in a socket or base-support to carry out the plan of projecting a ball, as said, to any point of the compass. To the shorter end of the lever we attach a cord or similar flexible means of pulling said arm downward, and which passes to a point below the pivot of the lever, where it is confined in a slot, hole, or beneath a friction roller or pulley, in such a manner that the cord will on being pulled draw the arm downward and throw the longer arm upward with force—*i. e.*, that end which carries the ball. This latter arm in its upward motion strikes against a cushion or "stop" on attaining an angle of forty-five degrees, or about that degree, and projects the ball at a right angle from a plane passing at a similar angle through the axis of the cup, which terminates this arm of said lever in the direction of the ordinary flight of a bird, or, rather, in a parabola extending somewhat horizontally.

In the drawings, which represent one of the forms in which we construct the said trap, A is a stake or post, sharpened at the bottom, (and preferably of metal,) so as to be driven readily into the ground or other place, having a socket in its upper end to receive the lower end of a revolving post or rod, B. In this post or similar socket or vertical hole is pivoted, so as to revolve vertically, said post or rod B, which terminates above in a curved end, $e$, or stop, to check the upward motion of the lever C. In this post B is pivoted, in such a manner as to allow vertical oscillation, a lever, C, whose longer arm carries the usual cup, $g$, and a cord or wire, $f$, on its shorter arm, which passes hence through a slot, $k$, in the said post B, and thence to the hand of the operator or trap-puller. The cup does not sit exactly in a line with that of the lever C, but, as seen in profile in Fig. 1, is inclined toward that point or end of the lever.

The operation of this invention needs little or no explanation; but its advantages over others may be thus stated: First, the velocity of the balls can be varied at the will of the operator by the force of the pull; second, the trap can be set and manipulated with great speed, for the lever descends by its own weight, and is then in position for another pull; third, it offers a larger field of practice to the marksman, as it can be made to throw balls with different velocities, according to the force of the pull on the cord, and also project the balls to any point of the compass by merely turning the post B or lever C in the desired direction; fourth, this trap does not break the glass balls—a common fault in other traps.

What we claim as our invention is—

1. In a ball-trap, a medially-pivoted lever, actuated by means of a cord or wire attached to one end of same, to propel objects from the free end, jointly with the co-operation of a stop, against which said free arm of said lever strikes to deliver the ball, substantially as described.

2. The combination, with a vertical revolving post or rod, B, having stop e, of the medially-pivoted throwing-lever C, with its actuating-cord f, substantially as and for the purposes described.

3. The combination of the cord f, lever C, post B, and socket A.

4. The construction of the trap for projecting balls, consisting of the propelling-lever C, with cup g, pivot d, cord f, post B, adapted at the lower end to fit into a socket in which it can be revolved, substantially as and for the purposes described.

In testimony that we claim the foregoing improvement in ball-traps we have hereunto set our hands this 13th day of May, A. D. 1879.

CHAS. F. STOCK.
DAVID M. MORRIS.

Witnesses:
SAMUEL D. WEAD,
E. P. ASHTON.